United States Patent [19]

McAllister et al.

[11] 4,275,170
[45] Jun. 23, 1981

[54] METHOD OF MAKING A FIRE RETARDANT POLYMER RESIN

[75] Inventors: Lawrence E. McAllister, Dayton; Herbert Dietrich, Kennebunk, both of Me.

[73] Assignee: Fiber Materials, Inc., Biddeford, Me.

[21] Appl. No.: 73,218

[22] Filed: Sep. 7, 1979

Related U.S. Application Data

[63] Continuation-in-part of Ser. No. 58,567, Jul. 18, 1979, abandoned.

[51] Int. Cl.³ ............................................. C08V 9/14
[52] U.S. Cl. .................... 521/103; 260/38; 260/DIG. 24; 521/130; 521/136; 521/181; 521/907; 528/138; 528/144; 528/155
[58] Field of Search ............... 528/155, 144, 138; 521/181, 136, 103, 130

[56] References Cited

U.S. PATENT DOCUMENTS

| | | | |
|---|---|---|---|
| 2,478,943 | 8/1949 | Rhodes | 528/155 |
| 2,504,100 | 4/1950 | Plank et al. | 528/138 |
| 2,582,228 | 1/1952 | Brinkeura | 528/155 |
| 2,744,875 | 5/1956 | Thomas et al. | 528/155 |
| 2,859,205 | 11/1958 | Lection | 528/138 |
| 3,298,973 | 1/1967 | Quarles et al. | 528/138 |
| 3,410,818 | 11/1968 | Yurcick et al. | 528/144 |
| 3,518,159 | 6/1970 | Freeman et al. | 528/155 |
| 3,677,986 | 7/1972 | Buchanan | 528/155 |
| 3,876,620 | 4/1975 | Moss | 528/155 |
| 4,036,793 | 7/1977 | Moss | 528/155 |
| 4,048,145 | 9/1977 | Moss | 528/155 |
| 4,053,447 | 10/1977 | Shea | 528/155 |
| 4,107,127 | 8/1978 | Shea | 528/155 |
| 4,111,911 | 9/1978 | Weissenfels et al. | 528/138 |
| 4,176,216 | 11/1979 | Reid | 528/138 |

*Primary Examiner*—Morton Foelak
*Attorney, Agent, or Firm*—Schiller & Pandiscio

[57] ABSTRACT

Flame retardant polymer resins formed by an acid condensation reaction from a mixture of resorcinol and furfural with a molar excess of the aldehyde. In one particular embodiment the resin is formed of a mixture of two prepolymer solutions with at least a boric acid catalyst, one or both of the prepolymer solutions being an acid-condensation reaction product of resorcinol and furfural with excess aldehyde functionality, or one of the prepolymers being a mix of substantially unreacted resorcinol and furfural with a slight molar excess of aldehyde.

4 Claims, No Drawings

METHOD OF MAKING A FIRE RETARDANT POLYMER RESIN

This application is a continuation-in-part of copending application Ser. No. 058,567, filed July 18, 1979, now abandoned.

The present invention relates generally to flame-retardant polymer resins, and in particular to novel synthetic polymer resins which are self-extinguishing and non-punking upon exposure to flames. The invention also contemplates novel processes for producing novel synthetic polymer resins having the aforesaid characteristics. The invention has particular utility in connection with the preparation of synthetic polymer resins in foam form for use in thermal insulation systems and will be described in detail in connection with such utility. However, the invention is not limited to the production of polymer foams as will become clear from the description following.

Various synthetic polymer resins are known in the art and have achieved substantial commercial utility. By way of example, polymer foams based on polyurethane and on polystyrene formulations have achieved substantial use in thermal insulation systems. Polyurethane-based polymer foams offer certain processing advantages in that they may be foamed in situ, and may also be cast in structurally self-supporting sheet or panel form. On the other hand, polyurethane and polystyrene-based polymer foams per se are highly flammable. In order to reduce flammability of polyurethane and polystyrene-based polymer foams, it has been proposed to incorporate phosphorous and halogen containing additives into the foam formulations. While modifying polyurethane and polystyrene based polymer foams in accordance with the foregoing may render the resultant polymer foams self-extinguishing, the resultant polymer foams generally produce toxic smoke when exposed to open flame. Moreover, some pyrolysis products of polyurethane and polystyrene-based polymer foams also are flammable, and may cause flash fires if they collect in a closed area. These and other problems and disadvantages have restricted wider commercial use of polyurethane and polystyrene based polymer foams in thermal insulation systems.

Polymer foams based on polyimides, polybenzimidazoles, polyphenylquinoxilines, pyrrones, and other highly aromatic polymer materials have also been proposed for use in thermal insulation systems. While polymer foams based on such highly aromatic polymer materials are said to offer extremely high flame retardancy characteristics, none of these polymer foams is believed to have achieved any substantial degree of commercial utilization due to high raw materials cost. Also, limiting commercial utilization of such polymer foams are the requirements for special processing techniques and apparatus for producing the foams.

Polymer foams based on ureaformaldehyde and phenolformaldehyde have also been proposed for use in thermal insulating systems, and have achieved some degree of commercial utilization. Polymer foams based on ureaformaldehyde and phenolformaldehyde are relatively inexpensive, and can be foamed in situ using commercially available foaming apparatus. Also, polymer foams based on ureaformaldehyde exhibit good mechanical properties but generally generate relatively large quantities of smoke upon exposure to flame, and such polymer foams also are susceptible to degradation in the presence of moisture. Polymer foams based on phenolformaldehyde also exhibit good mechanical properties, and in addition generally are stable in the presence of moisture. Moreover, polymer foams based on phenolformaldehyde exhibit relatively low flame spread and smoke generation on exposure to flames. On the other hand, polymer foams based on phenolformaldehyde generally suffer from so-called "afterglow" or "punking", a phenomenon that causes the foam to be consumed by flameless oxidation after exposure to a fire. While a number of investigators have proposed various solutions for making phenolic foams non-punking, none of such solutions is believed to be entirely satisfactory. Many polymers utilized in foam formulations employ alkali or alkaline earth materials as polymerization catalysts and it is believed that such materials may in fact contribute to combustion of the polymer.

It is thus a primary object of the present invention to provide new and improved synthetic polymers which overcome the aforesaid and other problems of prior art. Another object of the present invention is to provide new and improved polymer foams for use in thermal insulation systems, which foams are characterized by low flame spread, low smoke generation, and resistance to afterglow or punking. Still another object of the present invention is to provide new and improved polymer foams of the type above-described which exhibit good mechanical properties and resistance to moisture. Still another object of the present invention is to provide a novel process for producing polymer foam materials having the aforesaid characteristics.

The invention accordingly comprises the processes involving the several steps and relative order of one or more such steps with respect to each other, and the materials and products possessing the features, properties and relations of elements which are exemplified in the following detailed disclosure and the scope of the application of which will be indicated in the claims.

Generally, in the practice of this invention, new phenolic resins based on phenol-aldehyde are derived as the reaction product of a polyhydric phenol with an aldehyde polymerized with a catalyst. In one form, the resins are derived from a two-part formulation comprising: Part (A) is a stable, low viscosity liquid, low molecular weight prepolymer in which is an acid-condensation reaction product of an aldehyde and a polyhydric phenol, containing excess aldehyde functionality, and Part (B) another low viscosity liquid which can either be (1) an acid-condensation reaction product also of an aldehyde and a polyhydric phenol, containing excess aldehyde functionality or (2) another low viscosity liquid which is a substantially unreacted mixture of aldehyde and polyhydric phenol, containing aldehyde in molar excess. In the two part formulation, Part (A) also contains an active polymerization catalyst, a solid acid that requires water for initiation, and Part (B) contains a polymerization catalyst which comprises an inorganic Lewis acid containing water of hydration, such as boric acid or a boric acid complex. Both Parts (A) and (B) of the formulation are substantially unreacted until the two parts are mixed together.

In a preferred embodiment of the invention the aldehyde comprises furfural and the polyhydric phenol comprises resorcinol.

Still other objects and many of the advantages of the present invention will become clear from the description following.

As used herein the terms "Part (A)" and "Part (B)" are employed solely for convenience to distinguish the initial aldehyde/phenol acid-condensation reaction product part of the two-part formulation containing active polymerization catalyst on the one hand, from the aldehyde/phenol mixture (reacted or unreacted) part of the formulation on the other hand.

In preparing the novel phenolic resins in accordance with the present invention, the first step is to separately prepare the two formulations Parts (A) and (B). To prepare Part (A), an aldehyde and a polyhydric phenol are mixed together in a ratio of between about two and four moles of the aldehyde for each mole of polyhydric phenol. To this mixture is added a relatively small amount (e.g. 0.1 to 1.0 weight percent) of a mineral acid such as 10% HCl solution in water. The acid catalyzes the condensation polymerization of the aldehyde and the phenol to form a relatively low molecular weight linear polymer having excess aldehyde functionality. This polymer is a relatively stable, low viscosity liquid. Part (B) of the formulation is prepared either identically to Part A, or by mixing an aldehyde and a polyhydric phenol in a ratio between about one and two moles of the aldehyde for each mole of polyhydric phenol. Preferably, but not necessarily, the aldehyde and the polyhydric phenol in Part (A) of the formulation, and the aldehyde and the polyhydric phenol in Part (B) of the formulation, are chemically identical. The resulting mixture (Part B of the formulation) is a relatively stable solution of the polyhydric phenol in the aldehyde, little or no reaction occuring upon mixture of the aldehyde and the polyhydric phenol unless a mineral acid catalyst is added as would be the case where Part B is prepared in the same manner as Part A.

The next step is to incorporate selected catalysts into Parts (A) and (B) of the formulation. A feature and advantage of the present invention resides in the selection of, and distribution of a condensation polymerization active catalyst in one part of the formulation and a polymerization initiation catalyst in the other part of the formulation such that both Parts (A) and (B) of the formulation remain stable, and relatively unreactive until they are mixed. The polymerization active catalyst is added to Part (A) of the formulation, while the polymerization initiation catalyst is added to Part (B) of the formulation. The polymerization active catalyst added to Part (A) is a solid organic acid which is water soluble, but is substantially insoluble in Part (A) of the formulation. The acid in solid form is inactive as a polymerization catalyst.

The polymerization initiation catalyst added to Part B comprises boric acid. The boric acid polymerization initiation catalyst serves several functions, but primarily acts as an activator to initiate rapid polymerization once Parts (A) and (B) of the formulation are mixed together. Also, the boric acid is believed to undergo chemical reaction with the low molecular weight polymer of the formulation Part (A) and thereby becomes an integral part of the final cured polymer network.

Upon polymerization, the following reaction is postulated to occur between the boric acid and the resorcinol in Part (B) and also with available resorcinol hydroxyl groups:

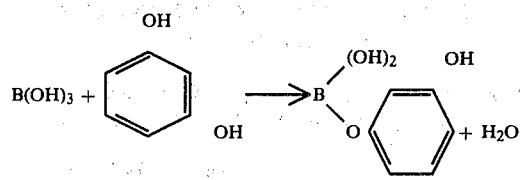

The degree to which Reaction I occurs and the actual number of functional sites involved in chemical reaction is not known. However, it is also believed that the boric acid may also react with free resorcinol or resorcinol that has been reacted to form the low molecular weight polymer product of Part (A).

As mentioned supra, Part (A) and Part (B) of the formulation are relatively stable liquids until they are mixed together. However, once Parts (A) and (B) are mixed together with the catalyst, a condensation polymerization commences, and the solid boric acid partially dissolves in water produced by the condensation polymerization reaction, and thus becomes active so as to catalyze complete cure. One skilled in the art will recognize the use of a solid boric acid catalyst in accordance with the present invention provides the two fold functions of (1) controlling release of active acid catalyst whereby to maintain control over the exothermic condensation polymerization reaction of the polymer, and (2) providing sufficient catalyst release to insure complete cure of the resin over a period of time which may be varied. Polymerization generally is initiated within about 60 and 180 seconds following mixing of the formulation Parts (A) and (B), depending on the initial temperature of the materials and catalyst concentration. Complete curing at room temperature generally occurs within several hours thereafter. Polymerization rate and degree of polymerization can be varied by varying the acid catalyst in Part (A), amount of acid catalyst present in Parts (A) and (B), particle size of acid catalyst (solid acids) and/or degree of hydration of the acid catalyst (solid acids).

The two-part prepolymer compositions are separately formulated, and are maintained isolated from one another until the polymer is to be formed. The novel polymer material of the present invention may be formed as a foam by incorporating known foaming agents such as polyhalogenated saturated fluorocarbons in known manner and employing known production equipment, and may be cast as foamed board stock on continuous production equipment, or the polymer materials may be foamed in situ. Alternatively, the polymer material of the present invention may be formulated in appropriate weight for use as a fire retardant coating, in a laminate or with ablative materials as will be described in detail hereinafter.

More specifically, the aldehyde compounds used herein comprise a low molecular weight unsaturated aldehyde such as furfuraldehyde (furfural) and mixtures of furfural and paraformaldehyde. The polyhydric phenol comprises resorcinol and substituted resorcinols such as methyl resorcinol. Resorcinols have been found to provide polymers which are highly cross-linked and tend to be thermally stable. Methyl resorcinol used in the present invention tends to produce a stronger, less friable polymer foam than resorcinol, Other phenols may be combined, such as phenol, metacresol, orthocresol, 3,5-dimethylphenol and the like but with at least a minor amount (e.g. 25% or more by weight of the polyhydric phenol present. To prepare prepolymer Part A, a mixture of aldehyde and polyhydric phenol is made, generally in a molar ratio of about three to one. Then a small amount, e.g. about 0.5 weight % of dilute inorganic acids such as 10% HCl solution in water is added. An exothermic reaction occurs resulting in the condensation reaction between the aldehyde and the phenol. Since the aldehyde is in substantial molar excess, the condensation reaction product is a liquid low molecular weight prepolymer with excess aldehyde functionality. The resulting product is a relatively low viscosity liquid. An important feature and advantage of the present invention is to prepare this portion of the prepolymer prior to the polymer foaming operation. By preparing the prepolymer in this manner much of the exothermic reaction occurs prior to actual foaming. This permits foaming to be carried out such that the polymer product may be reproduced in a controllable and useful manner. A small amount of solid, water soluble organic acid can now be added as a catalyst.

Part (B) of the prepolymer can be a pre-reacted mixture of the aldehyde and phenol comprising the same molar ratio as Part A, or a substantially unreacted mixture of aldehyde and phenol, with the aldehyde in a slight molar excess, e.g. typically the aldehyde is in molar excess relative to the phenol in the range of about 1.25:1 to 1.5:1. The boric acid catalyst is now added. The resulting mixture comprises a low viscosity liquid.

Formulations have also been developed that incorporate furfuryl alcohol in either Part A or Part B or both. Furfuryl alcohol monomer behaves chemically in a manner similar to the initial reaction product between phenols and aldehydes which is also an alcohol. Therefore, from the standpoint of chemical stoichiometry of the resin system, one mole of furfuryl alcohol is the equivalent of one mole of a phenol and one mole of an aldehyde.

Formulations of up to 50 weight % furfuryl alcohol in the overall resin have been prepared. Approximately 9.0 weight % is preferred from the standpoint of processing ease and final foam properties. For a 2.65 lb/ft$^3$, foam compressive strength was increased from 9.0 psi to 16 psi by addition of 9.0 weight % of furfuryl alcohol.

The two-part prepolymer system is now ready for use in preparation of polymeric materials of the present invention, particularly for processes of preparing foams, in which processes rapid polymerization time is important to preserve the cellular foam structure. The approach used is to prepare a two-part formulation in the above manner resulting in stable unreactive prepolymer mixtures. If desired, a foaming agent such as one of the Freons (trademark of E.I. DuPont Co. for certain fluorocarbon liquid/gasses refrigerant) may be added to a mixture of the two prepolymers for producing a polymer foam. Alternatively, where the polymeric material is to be employed as a coating, in a laminate or in a composite ablative material, the two parts prepolymers are mixed together without blowing or foaming agents and with, if desired, inert fillers. Also, in such case, the two part system may not be necessary inasmuch as rapid polymerization is not required.

As mentioned supra an important feature of the present invention is to prepare the two-part prepolymer system in such a manner that much of the heat of reaction is produced prior to the actual polymer formation. Still another important feature of the present invention resides in the use of certain solid, water-soluble organic acids as the polymerization catalyst in the two-part system. By employing an organic acid in inactive solid form, the latter will remain solid in the prepolymer until dissolved in water of condensation produced during polymerization. That is to say, the acid becomes active only as it dissolves in available water. This permits controlled release of active acid catalyst whereby control is maintained over the exothermic polymerization reaction of the prepolymers and thereby provides sufficient catalyst release to insure complete cure of the foam over a period of several hours after initial preparation of the foam. Generally, the water-soluble, solid, organic acid catalyst useful in accordance with the two part system of the present invention are acids such as citric, fumaric, itaconic, malic maleic, oxalic and tartaric acids. Liquid organic acids such as acetic and acrylic can be used, but are not preferred because of their reactivity. Moreover, the degree and rate of polymerization can be varied by varying the particular solid organic acid catalyst used, amount of that acid catalyst, particle size of that acid catalyst and the degree of hydration of that acid catalyst. For example, polymerization of the two-part prepolymer resin system can be made to proceed faster if the solid organic acid catalyst has a small particle size, is highly soluble in water and anhydrous initially. In general the higher concentration of catalyst present, the faster and further polymerization will occur. Catalysis without heat by these organic acids requires the presence of boric acid.

In addition to solid organic acid catalyst materials, certain mineral acids can be employed as polymerization catalysts in accordance with the present invention. Among such acids are phosphoric acid, phosphorous acid, sulphuric acid, hydrochloric and organic acid phosphates such as butyl phosphate and the like. However, mineral acids generally are more difficult to control and thus generally are not preferred catalysts materials except for coatings, laminates and ablative composites, particularly in the one part system of the present invention.

As noted, an important feature of the two part system of the present invention is the addition of boric acid to Part (B) prepolymer. The presence of boric acid in the prepolymer and the resulting polymer provides heat absorption in a fire environment due to release of large amounts of water of hydration available in the boric acid. Boric is a Lewis acid and tends to catalyze char formation during pyrolysis which in turn reduces the quantity of combustion gases which might otherwise be generated when the polymer material is exposed to flame. Boric acid is also believed to be coreactive with the prepolymer thereby entering into the polymer structure. Finally, boric acid is a glass-forming material, and such boric oxide glass can melt and thereby add oxidation protection to the charred foam in a fire environment.

The degree to which boron incorporation occurs and actual number of functional sites involved in the polymerization reaction inclusion of boron is not known; however, it is believed that boron reaction may also occur on free phenol or phenol that has been reacted into the prepolymer. The boric acid is also believed to function as an activator to initiate polymerization after Parts (A) and (B) of the prepolymers are mixed together. This activation is believed to be related to reaction of boric acid with the polymer and its role as a Lewis acid. Thus, if Parts (A) and (B) of the prepolymer are mixed together and the foam prepared without the presence of boric acid, the system is essentially nonreactive and polymerization does not commence. On the other hand, the addition of a small amount of boric acid has been found to immediately activate the system causing polymerization to proceed. Polymerization can also proceed without boric acid if a strong mineral acid such as HCl is added; however, polymerization under these conditions is difficult to initiate unless relatively large amounts of acid are required. Once such polymerization is initiated it is very exothermic and difficult to control, hence is used herein primarily to form ablative materials from a single-part system of mixed furfural and resorcinol.

Because the nature of some of the primary ingredients used to synthesize the two part resin system are acidic, self-polymerization will tend to occur gradually over a period of time. It has been found that the use of "acidic" or "basic" inorganic powder fillers can be used to either accelerate self-polymerization or to retard it. As an example, the incorporation of as little as 5 wt % calcium sulphate hemihydrate will accelerate self-polymerization, while the addition of 5 wt% commercial Portland Cement will retard self-polymerization. Various fillers such as mica, wollastonite, calcium silicate, titanium dioxide, and aluminum trihydrate have also shown similar behavior.

It is evident that the use of "acidic" and "basic" inorganic fillers can be used to either prolong the storage or shelf life of the prepolymers, or can be used to prime the activity of prepolymers prior to acid catalyzation in order to control final polymerization and the resulting properties of the foam.

The polymeric materials resulting from mixing prepolymers Parts A and B in the presence of the boric acid catalyst, if produced in the presence of a foaming agent, may be used as thermal insulating systems. Alternatively, by omitting the blowing agent and adjusting catalyst concentrations, the same two-part polymer system may be employed as a fire retardant resin coating, or in a laminate or in conjunction with an ablative composite material, although for the latter, a single-part system is less expensive.

For example, another method of producing a fire retardant resin, particularly useful for forming ablative materials, is by a single part system exemplified by the direct reaction of a phenol and an aldehyde in the presence of an acid catalyst. The preferred approach is to form a solution of resorcinol in furfural in molar ratios ranging from about 0.5 to 1. This solution is stable and essentially nonreactive until the catalyst is added. Any of the acid catalysts or catalyst combinations described in the previous disclosure are applicable. The resulting polymer may lack the advantages conferred by the boric acid if the latter is not used, but does constitute an excellent ablative material.

This approach is preferred for use in formulating fire retardant coatings and ablative composites. In producing these coatings and composites, additives such as pigments and refractory fibers are combined with the chemical solution. When these additions are properly dispersed, the system is suitable for application. A catalyst system is then added to initiate the polymerization reaction leading to a cured coating or composite. The catalyst is selected to provide a relatively slow ambient temperature polymerization without excessive exotherm.

After addition of the catalyst, the formulation can be cast, sprayed or spread depending on the configuration and/or use of the final product. Polymerization to form a cured product occurs at ambient temperature over a 24–48 hour period. Heat can be used to accelerate this polymerization.

The following examples, which are illustrative and not meant to be limiting, are given to provide an additional description of the invention. In order to test for fire resistance the resulting polymeric compositions were exposed to the cutting flame of an oxyacetylene torch.

EXAMPLE I

A flask equipped with an agitator was charged with a mixture of furfural and resorcinol in a mole ratio of 3.6 to 1. Approximately 2 weight percent of 10% HCL solution in water was added. The contents were observed to heat up, and the solution was continually stirred for a short period of a few minutes to provide the condensation reaction product between furfural and resorcinol, hereinafter called Part A.

A second flask equipped with an agitator was charged with a mixture of furfural and resorcinol in a molar ratio of 1.3 to 1. The resorcinol was observed to dissolve in the furfural to provide Part B.

To 168.3 grams of the prepolymer condensation reaction product of Part A was added 10 grams of tartaric acid. To 152.0 grams of the mixture of furfural and resorcinol prepared as Part B is added 55 grams of boric acid, 50 grams of Freon 113 (trichlorotrifluoroethane), and 9 grams of a surfactant to aid foaming (UCC5340 non-ionic silicon available from Union Carbide Corporation).

To produce polymeric foam, Part A of the preparation and Part B of the preparation are combined in a ratio of 1 to 1.45 parts by weight and mixed by a motor driven stirrer. Foaming is seen to occur within about 60 to 180 seconds at ambient temperature. However, several hours are required before complete cure is obtained. The resulting product is a rigid foam of approximately about 1.8–2.8 pounds per cubic foot density. The foam is tested for flammability by subjecting the foam product to the flame of the torch. No visible smoke to detectable odor is observed, and no sign of combustion or flammability is noted. Additional properties of this foam are given in the following table.

The foam, tested for physical properties and flammability has the following characteristics:

| | | |
|---|---|---|
| Nominal Density | 1.8–2.8 lb/ft$^3$ | |
| Closed Cell Content | 30% | |
| K-Factor (initial) | $0.24 \frac{\text{BTU IN}}{\text{ft}^2 \, °\text{F. hr}}$ | |
| Water Vapor Permeability | .70 Perms | |
| Water Absorption | 3.6% by Volume | |
| Compressive Strength (parallel to rise) | 9 psi (2 lb/ft$^3$) 19 psi (2.8 lb/ft$^3$) | |
| Flexural Strength (load deflection @ 75% of compression load) | 7.6% | |
| Flammability Test | Flame Spread Factor 1 Flame Spread Index 1 | Heat Evolution Factor 1.1 |
| Smoke Test (NBS) | Specific Optical Density | |
| | | 90 sec    4 min |
| | Non-Flaming | 0         0 |

| -continued | | |
|---|---|---|
| Flaming | 0 | 1 |

EXAMPLE II

Prepolymer foam resin is prepared by mixing 1,273.9 g furfural, 627.5 g resorcinol, 100.0 g surfactant and 5.7 g of acid catalyst in a reaction vessel. The catalyst may be a hydrochloric acid solution such as in Example I. However, a preferred catalyst consists of a mixture of 10 parts by weight organic acid phosphate such as PA-75 (a phosphoric acid derivative sold by Mobil Oil Co.) to 90 parts furfural. After mixing, a slow condensation reaction occurs between the furfural and the resorcinol. From this same prepolymer mixture, Part (A) and Part (B) are prepared. Part (A) consists of 1,012.1 g of prepolymer, 198.3 g tartaric acid, and 406.7 g of freon 113. Part (B) consists of 995 g prepolymer and 608 g boric acid.

To produce a foam, equal volumes (1:1) of Part (A) and Part (B) are mixed together using a high shear laboratory mixer. Foaming is seen to occur within about 60 to 180 seconds at ambient temperature. As in Example 1, several hours are required before complete cure is obtained. The resulting product is a rigid foam of approximately 2 to 3 pounds per cubic foot density with physical properties and fire retardant properties similar to the foam described in Example 1.

EXAMPLE III

To prepare fire retardant coating, prepolymer Part A is formed by mixing together the following by weight: furfural 43%, resorcinol 10.5%, acetal (Formvar 15/95E) 3.5%, titanium dioxide 31.5%, aluminum trihydrate 10.5%, surfactant DC 193 1.0%, with a trace of 85% phosphoric acid to serve as a catalyst. Titanium dioxide is added simply as a pigment to change the normal black color of the cured resin to a battleship gray. The acetal is added to provide toughness and flexibility to the cured resin coating when applied to substrates such as aluminum and steel, without sacrificing fire retardancy.

Prepolymer Part B is formed by mixing together the following by weight: furfural 37%, resorcinol 34%, boric acid 29%.

A formulation consisting of 63.8% Part A and 36.2% Part B from this example is used to coat mild steel plates measuring ¼"×12"×18" using a nylon paint brush. The coatings will gel within one to two hours and are then heat cured for several hours at 150° F. When the coatings are exposed to the flame of an oxyacetylene torch they will not burn or propagate a flame.

EXAMPLE IV

The preparation of fire retardant laminates using fiberglass cloth embedded in a cured resin matrix is accomplished by preparing the resin in the same manner as the coating resin described previously in Example III with the exception that no pigments are used. However, the use of a pigment is technically feasible. As with the coatings, no blowing agent is used and the acid catalyst is modified to suit the particular requirements for polymerization of the laminate-resin structure.

Once again the incorporation of an acetal such as Formavar 15/93E is believed to improve the adhesion of the resin to the surface of the fiberglass, and the resulting laminate will exhibit no burning or flame propagation when subjected to the flame of the torch.

EXAMPLE V

The preparation of a fire retardant ablative composite material is accomplished from a single part mixture in the following manner: 1,641 g of furfural are mixed with 867 g of resorcinol using a high shear mixer. To this resin mixture 418 g of a refractory type fiber are added while the resin is being mixed. Ideally a Banbury or Hobart type mixer should be used for beating the fibers into the resin mix to minimize breakdown. These fibers may be carbon, graphite, or silica; however, graphite fibers are preferred.

The resin-fiber mixture can be catalyzed by any of the previously mentioned acids in sufficient quantity. However, a preferred catalyst consists of a mixture of 25 parts by weight of an phosphoric acid derivative such as PA-75, to 75 parts furfural. Typically up to 50 ml of the catalyst mixture will initiate a controllable room temperature cure within 24 hours. In this example, the resin/fiber batch is transferred into a gallon metal container and the catalyst is added. Uniform mixing of the catalyst and batch is achieved by immediately closing the metal container and shaking it for approximately five minutes on a gyratory type paint shaker. Alternatively, larger batches may be catalyzed using a rotating mortar mixer, or a Banbury or Hobart type mixer.

Such an ablative material as described above can be cast into moulded shapes using vibrating equipment or manual tamping of the mould. The density of the finished part can vary from 80 to 100 lbs/ft$^3$ depending on the amount of entrained air that is removed during the casting process.

EXAMPLE VI

In another example of an ablative material to the same mixture as described in Example V, up to 10PHR high surface area carbon black is added prior to catalyzation. The carbon black absorbs excess resin during casting, minimizing resin run-out. In addition, the carbon black imparts a thixotropic nature to the resin allowing it to be troweled onto vertical surfaces without slumping or falling off.

Since certain changes may be made in the above method without departing from the scope of the invention herein involved, it is intended that all matter contained in the above description or shown in the accompanying drawing shall be interpreted in an illustrative and not in a limiting sense.

What is claimed is:

1. Method of forming a flame retardant polymer resin, comprising the steps of
   reacting moieties of a first aldehyde and first phenol in the presence of a mineral acid in sufficient proportions to provide an acid-condensation reaction product in the form of a relatively low molecular weight, low viscosity liquid linear polymer having excess aldehyde functionality, said first aldehyde being selected from the group consisting of furfural and mixtures of furfural and paraformaldehyde, said first phenol being selected from the group consisting of metacresol, orthocresol, 3,5 dimethyphenol, resorcinol and substituted resorcinols;
   mixing moieties of a second aldehyde and second phenol to provide a solution of said second phenol in said second aldehyde, which solution contains said aldehyde in molar excess, said second aldehyde and second phenol being selected from the same groups as said first aldehyde and first phenol;

adding to said reaction product a solid, organic, water soluble acid as a polymerization active catalyst;

adding to said solution an inorganic acid polymerization catalyst containing water of hydration, said inorganic acid being selected from the group consisting of boric acid and boric acid complexes;

reacting said reaction product and solution in the presence of said catalysts to produce condensation polymerization thereof into said resin.

2. Method of forming a resin according to claim 1 wherein said organic acid is selected from the group consisting of citric, acetic, fumaric, acrylic, itaconic, malic, maleic, oxalic and tartaric acids.

3. Method of forming a resin according to claim 1 wherein said phenol is resorcinol, said aldehyde is furfural; said reaction product being formed from a mixture of furfural and resorcinol in a mole ratio of about 3.6 to 1; said solution being formed from a mixture of furfural and resorcinol in a mole ratio of about 1.3 to 1.

4. Method of forming a resin according to claim 1 including adding a foaming agent prior to completion of the reaction of said reaction product and solution.

* * * * *